United States Patent
Mustafa et al.

(10) Patent No.: US 7,044,514 B2
(45) Date of Patent: May 16, 2006

(54) ENERGY-ABSORBENT COMPONENT

(75) Inventors: Mahmud Al-Haj Mustafa, Bornheim (DE); Roland Grutzner, Essen (DE)

(73) Assignee: Kautex Textron GmbH & Co. KG, Bonn (DE)

(*) Notice: Subject to any disclaimer, the term of this patent is extended or adjusted under 35 U.S.C. 154(b) by 0 days.

(21) Appl. No.: 11/083,043

(22) Filed: Mar. 17, 2005

(65) Prior Publication Data

US 2005/0218672 A1 Oct. 6, 2005

(30) Foreign Application Priority Data

Mar. 17, 2004 (DE) .................. 10 2004 013 370

(51) Int. Cl.
*B60R 19/22* (2006.01)
(52) U.S. Cl. .............. 293/109; 293/110; 293/120
(58) Field of Classification Search ............ 293/102, 293/109, 110, 120, 133
See application file for complete search history.

(56) References Cited

U.S. PATENT DOCUMENTS

| | | | | |
|---|---|---|---|---|
| 4,671,550 A | * | 6/1987 | Molnar | 293/102 |
| 5,385,375 A | * | 1/1995 | Morgan et al. | 293/109 |
| 5,780,129 A | * | 7/1998 | Ohta | 293/102 |
| 6,755,452 B1 | * | 6/2004 | Cate et al. | 293/120 |
| 6,793,256 B1 | * | 9/2004 | Carley et al. | 293/120 |
| 2003/0038488 A1 | * | 2/2003 | Kudelko et al. | 293/102 |
| 2004/0130167 A1 | * | 7/2004 | Mori et al. | 293/102 |

FOREIGN PATENT DOCUMENTS

| | | |
|---|---|---|
| DE | 32 09 464 | 9/1983 |
| DE | 199 42 073 A1 | 3/2000 |
| DE | 199 56 561 A1 | 5/2001 |
| EP | 0 947 727 | 10/1999 |
| EP | 0 738 580 B1 | 4/2000 |
| EP | 1 046 546 | 10/2000 |

* cited by examiner

*Primary Examiner*—Jason Morrow
(74) *Attorney, Agent, or Firm*—Grossman Tucker Perreault & Pfleger, PLLC

(57) ABSTRACT

Described is an energy-absorbent component for a motor vehicle, for example as a bumper, which is in the form of a blow-molded hollow body of thermoplastic material enclosing a foam filling on all sides. The hollow body comprises a plurality of chambers therein. The chambers are each closed in themselves and they each respectively accommodate a foam filling affording a differing energy absorption capability.

8 Claims, 2 Drawing Sheets

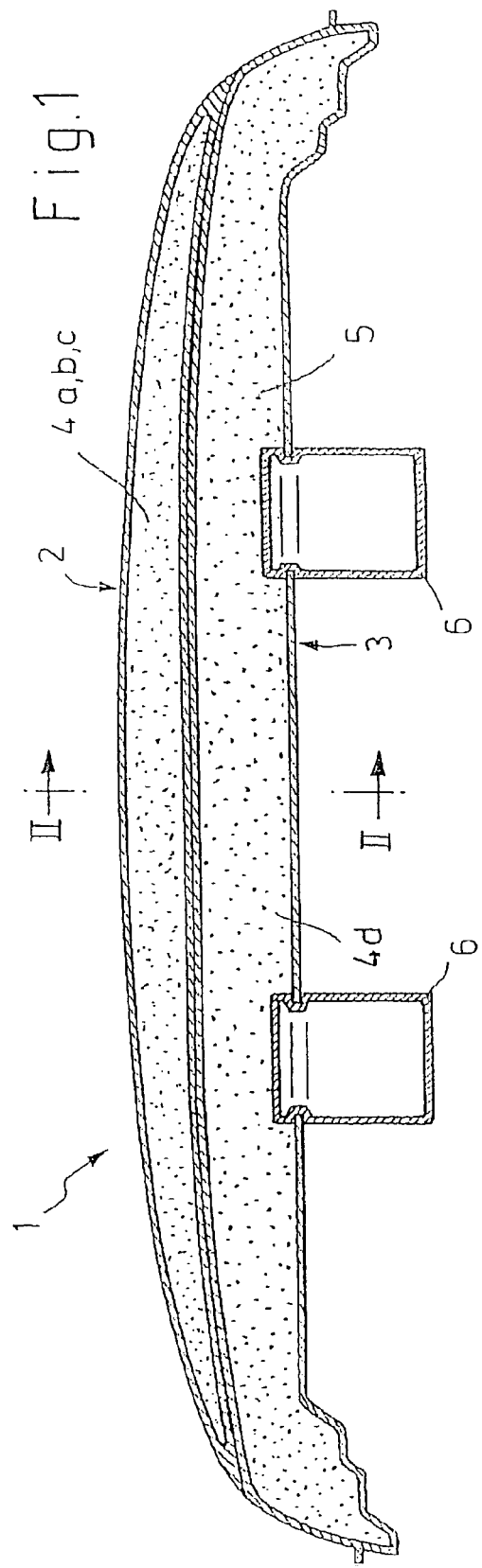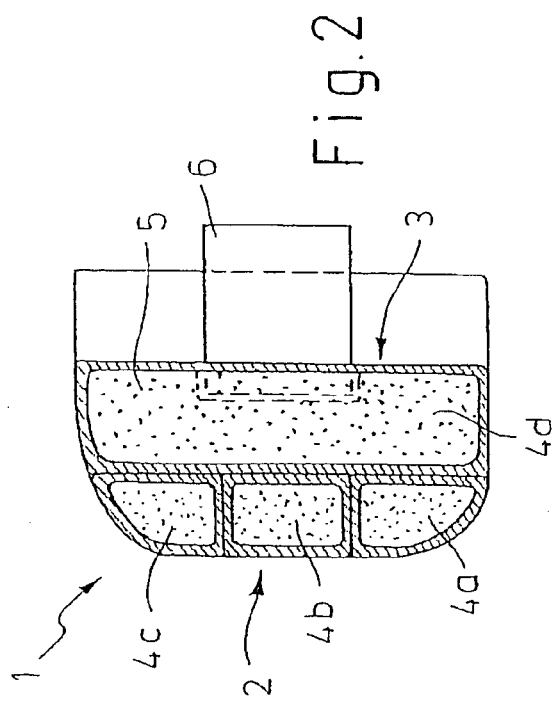

ENERGY-ABSORBENT COMPONENT

CROSS-REFERENCES TO RELATED APPLICATIONS

This application claims the priority of German patent application Ser. No. 10 2004 013 370.0 filed Mar. 17, 2004, the subject-matter of which is incorporated herein by reference.

FIELD OF THE INVENTION

The invention concerns an energy-absorbent component for a motor vehicle, for example as a bumper.

BACKGROUND OF THE INVENTION

An energy-absorbent structure which typically comprises a blow-molded hollow body of thermoplastic material which encloses a foam filling on all sides serves to absorb impact energy, the impact energy being dissipated by work done upon deformation of the structure. One consideration in that respect is that the impact energy which occurs in the event of the vehicle to which the energy-absorbent component is mounted being involved in a collision is dissipated or diverted in such a way that the vehicle itself does not suffer from permanent deformation, while a further consideration is that a vehicle bumper should also guarantee sufficient pedestrian protection, in other words, in the event of a collision with a pedestrian, the bumper should guarantee a low level of energy absorption with a long deformation travel to minimise pedestrian injury.

In the case of the motor vehicle to which the energy-absorbent component is fitted colliding with a harder obstacle at a somewhat higher speed, it is necessary to ensure that, depending on the respective impact energy involved, that energy is dissipated by way of the elastic deformation of other components of the vehicle, for example by way of deformation of flexural cross-bearers, crash boxes or impact dampers. That involves the need to provide structures which, as viewed in the direction of travel of the vehicle, exhibit a differing energy absorption capability. In addition however it is also desirable to provide different impact zones involving differing energy absorption capability in parallel relationship with the direction of travel as, in the event of an impact with a pedestrian, the position of the first impact determines the further movement of the body of the pedestrian. In that respect reference may be directed for example to EP 1 046 546 which indicates that it is desirable for the point of first impact in the case of a pedestrian accident to be as low as possible in order to prevent the risk of knee injuries. In order to guarantee that without additional installation fitments on the bumper, EP 1 046 546 sets forth a bumper whose region which is the lower region in the mounted condition thereof is of higher strength than the upper region in which then a comparatively low level of energy absorption takes place, with a relatively great deformation travel.

The bumper described in EP 1 046 546 comprises a shell-like cover with an opening which in the mounted condition of the bumper faces towards the passenger compartment and which is filled with a plastic foam. Foams of differing strengths are introduced over the cross-section of the arrangement into the cover. It is optionally provided that a structure for stiffening the cover is to be disposed within that structure.

It will be noted however that the arrangement described in EP 1 046 546 suffers from the disadvantage that the foam body which is not closed by the cover on all sides does not afford adequate stability in relation to a relatively severe impact. A reinforcing structure within the cover is required in order to divert a relatively high level of impact energy to the deformable component parts of the vehicle body, which are disposed behind the bumper. Finally, it is not impossible that, after a light impact against a firm solid obstacle, for example in a parking bump situation, the bumper may suffer permanent damage so that complete replacement of the bumper would then be necessary after such a crash. That is also to be attributed to the fact that the foam structure in the interior of the bumper is not enclosed and held in place on all sides.

Reference may also be made to DE 32 09 464 describing an energy-absorbent component in the form of a vehicle bumper which, while being of low weight, is intended to be substantially insensitive and resistant to impacts and bumps at the visible surface thereof. For that purpose it is proposed therein that a blow-molded bearer is provided at its outside with a cover of polyurethane foam. That admittedly achieved a differing energy absorption capability in the direction of travel of the vehicle to which the bumper is mounted, but it will be appreciated that it is difficult to achieve differing impact zones transversely with respect to that direction. Furthermore the manufacture of such a bumper is relatively complicated and expensive as the blow-molded bearer has to be placed in a molding tool, within which the remaining space is then filled with foam. For that purpose the bearer has to be previously treated with a bonding agent.

Attention may be directed to EP 0 947 727 A1 with a bumper system having a foam structure comprising three foam layers of differing energy absorption capabilities, the layers being arranged in parallel relationship with the direction in which forces are applied to the system. For that purpose it is proposed therein that a transverse bearer is arranged on the longitudinal frame bearer of the motor vehicle, with the foam structure being mounted to the transverse bearer. The different foam layers are glued together while a cladding system is mounted to the foam structure on the outside thereof. That arrangement is also comparatively complicated both in respect of structure and also in its manner of manufacture.

SUMMARY OF THE INVENTION

An object of the invention is to provide an energy-absorbent component affording varying impact zones with differing energy absorption capabilities.

Another object of the invention is to provide an energy-absorbent component for a motor vehicle which is easy to manufacture and which can satisfy differing demands in terms of people protection on the one hand and protection of a motor vehicle in relation to permanent impact-induced deformation on the other hand.

Still another object of the present invention is to provide an energy-absorbent component for a motor vehicle, which as an integral component provides a strong stable load-bearing structure with good absorption properties in regard to inflicting pedestrian injury and absorbing collision impact forces.

In accordance with the principles of the present invention the foregoing and other objects are attained by an energy-absorbent component for a motor vehicle, for example a bumper, in the form of a blow-molded hollow body of thermoplastic material which encloses a foam filling on all sides. The hollow body has a plurality of chambers which are each of a closed configuration and which respectively accommodate foam fillings of differing energy absorption capabilities.

In a preferred feature of the invention at least one chamber forms a bearer which is stiff in respect of shape and which extends over the entire length of the component.

In a further preferred feature of the invention, that chamber which forms the bearer can have, in front of same, a plurality of further chambers which extend in the longitudinal direction of the component and which form varying impact zones each of a differing energy absorption capability.

It is desirable if the chambers disposed in front of the bearer as impact zones are of an increasing strength in a downward direction in the position of installation of the component, for example on a motor vehicle.

In the event of a light impact for example with a pedestrian, energy absorption takes place for the major part over the above-described impact zones while in the case of a heavier collision for example with another vehicle, a large part of the energy would be transmitted by way of the comparatively rigid bearer to the vehicle structures which are disposed therebehind. Fixing means can also be provided on the rigid bearer for fixing the component to a transverse bearer on the vehicle or to a longitudinal bearer structure.

In a further preferred feature at least some of the chambers are respectively filled with foams of differing density.

A preferred configuration of the invention provides that the foam materials used in the energy-absorbent component are particle foams, for example and preferably in the form of minibeads. While the hollow body is produced in the form of a blow molding, minibeads of that nature can be comparatively easily introduced into the blow molding during the blow molding procedure. In that respect, the operating procedure involved can be such that compressed plastic beads are introduced into the expanded hollow body while still disposed within the blow molding mold, under a pressure which is higher than the pressure obtaining within the hollow body. That provides for completely filling the hollow body with the plastic foam. The individual particles of the plastic foam can be welded together for example by means of hot vapor but it will be appreciated that the stability of the foam body can also be achieved merely by way of the packing density within the respective chambers. Depending on the respective manufacturing procedure or process implementation involved, it can be provided that at least a part of the particle foam, upon being introduced into the expanded hollow body, is stuck or welded to the inside wall surface thereof as, in that stage of the process, the hollow body has not yet completely cooled down.

Another preferred feature of the invention provides that different regions of the hollow body are of differing wall thicknesses. The choice of the wall thickness of the various regions of the hollow body can be in accordance with the desired deformation characteristics.

In that respect, it can be provided in a further preferred feature of the invention that the chambers which are disposed in front of the above-mentioned bearer and which are provided as impact zones are of a smaller wall thickness than the chamber forming the bearer.

A further advantageous feature of the invention provides that the hollow body and the filling thereof comprise an at least similar plastic material, for the sake of improved recyclability of the component.

The foam materials used may be for example particle foams of a density of between 30 and 200 kg/m$^3$. In a preferred feature of the invention the foam material of the component is a polypropylene particle foam (EPP). As an alternative it will be appreciated that it is also possible to envisage using EPS (polystyrene) or PUR (polyurethane).

It will further be appreciated that the number and arrangement of the various chambers of the component according to the invention can be varied within wide limits.

Further objects, features and advantages of the invention will be apparent from the description hereinafter by way of example of a preferred embodiment of the invention.

BRIEF DESCRIPTION OF THE DRAWING

FIG. 1 shows a view of the energy-absorbent component according to the invention in the form of a motor vehicle bumper, FIG. 2 shows a view in cross-section through the bumper illustrated in FIG. 1.

DESCRIPTION OF THE PREFERRED EMBODIMENT

Figure 3:
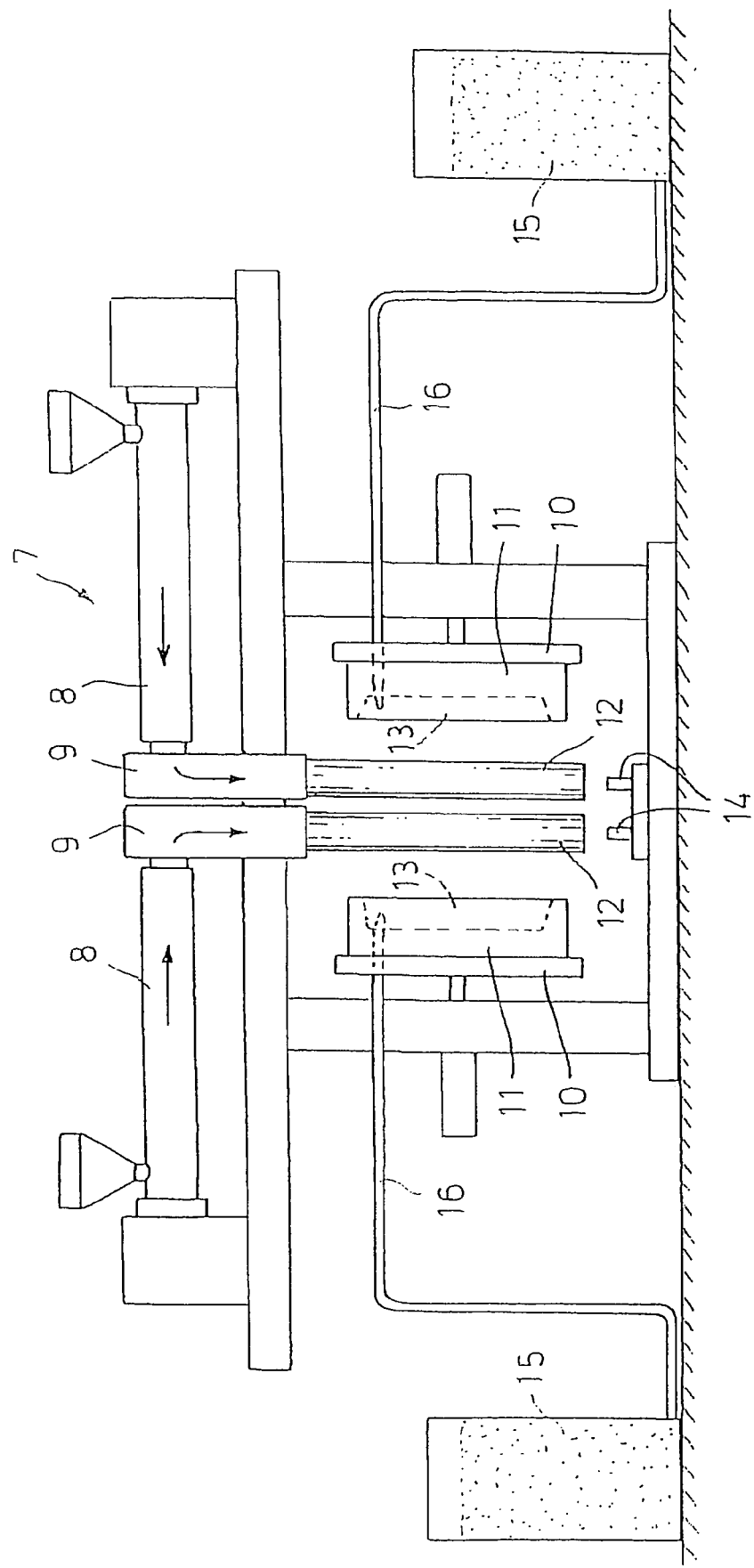
FIG. 3 shows a diagrammatic view illustrating the process in principle for production of the component according to the invention.

Referring to FIGS. 1 and 2, an energy-absorbent component for a motor vehicle is illustrated in the form of a bumper 1, comprising an integral plastic component produced by extrusion blow molding and obtained substantially in one operating procedure. The sectional view through the bumper 1 illustrated in FIG. 2 shows that it is in the form of a multi-chamber hollow body, as will be described in greater detail hereinafter.

It will be noted at this juncture that, for the sake of simplicity hereinafter the side of the bumper 1 which when mounted to a motor vehicle faces in the direction of forward travel of the vehicle and thus away from the engine bay or passenger compartment of the vehicle is referred to as the front side 2 whereas the side of the bumper 1 which faces towards the engine bay or the passenger compartment is referred to as the rear side 3.

Reference will be directed now more specifically to the cross-sectional view in FIG. 2 showing that the bumper 1 in this embodiment has a total of first through fourth chambers 4a, 4b, 4c and 4d. The chambers 4a, 4b, 4c form the front side 2 of the bumper and are arranged in mutually superposed relationship whereas the chamber 4d is arranged behind the chambers 4a, 4b and 4c in the direction of forward travel of the vehicle to which the bumper 1 is fitted. The chamber 4d extends over the entire length of the elongate bumper 1 and in the described embodiment is no longer segmented, although such segmentation would also be readily possible transversely with respect to the direction of travel of the vehicle. The chamber 4d of the hollow body constituting the bumper 1 forms a bearer 5 which is comparatively stiff in respect of flexing and shape and which has fixing elements 6 for mounting to a transverse bearer (not shown) of the motor vehicle. The fixing elements 6 can be integrally formed on the bearer 5 but it will be appreciated that they can also be formed in the bearer 5 in the form of insert members of metal in the course of manufacture of the bearer 5, as is the case in the specific embodiment described herein. In this case the fixing elements 6 can be in the form of longitudinal bearers. It will be noted however that it is also possible for the fixing elements 6 to be in the form of stiffening plates or also in the form of components affording different functions, for example as what are referred to as crash boxes.

In addition, for visual reasons, the bumper 1 can be provided with a cladding of suitable plastic material which is painted for example in the same color as the vehicle body. Such a cover would then serve only for optical purposes. It is for example usual for bumpers of modern motor vehicles to be painted the same color as the vehicle body. For that purpose, the bumper can have a suitably prepared and smooth outer skin which under some circumstances the component described herein does not have. A suitably prepared or painted outer casing which is to be fitted to the component can perform that purpose. It would then also be possible for example for the chambers 4a, 4b and 4c to be arranged at spacings relative to each other, forming intermediate spaces.

All chambers 4a, 4b, 4c and 4d of the multi-chamber hollow body are filled with a suitable foam filling, for example a polypropylene particle foam. For example the chamber 4d which forms the bearer 5 can be filled with an EPP foam (elastomer polypropylene) involving a volumetric density of between 80 and 200 kg/M$^3$.

The chamber 4a is filled with an EPP particle foam of a volumetric density of between 50 and 80 kg/m$^3$, the chamber 4b with an EPP particle foam of a volumetric density of between 40 and 60 kg/M$^3$ and the chamber 4c with an EPP particle foam of a volumetric density of between 30 and 50 kg/m$^3$. That arrangement provides that the strength of the impact zones of the bumper 1, which are formed by the respective chambers 4a, 4b and 4c, increases in a downward direction as considered starting from the chamber 4c, in the mounted position of installation of the bumper 1 on a motor vehicle.

Reference will now be made to FIG. 3 diagrammatically showing the basic principle of a process for production of the bumper 1. In FIG. 3 reference 7 denotes an extrusion blow molding installation comprising first and second extruders 8 and first and second extrusion heads 9, with first and second mold halves 11 fixed to mold mounting plates 10. First and second tubular preforms 12 of plasticised thermoplastic material are extruded by way of the extrusion heads 9, more specifically in parallel relationship between the mold halves 11 when in the opened condition. After closure of the mold halves 11 by way of a corresponding closing movement of the mold mounting plates 10 towards each other, the preforms 12 are expanded by means of blowing air in the usual fashion, within a mold cavity 13 formed by the co-operating mold halves 11. For that purpose the blowing air is introduced into the preforms from below by way of blowing bar members which are indicated at 14. During the preform expansion operation or immediately following same, foam can also be introduced by way of the blowing bar members 14 into the expanded preforms 12. The described embodiment involves at least two preforms which are extruded in mutually parallel relationship between the mold halves 11 in order to produce a segmented cross-section in the finished blow molding. It will be appreciated that this can also be done by means of extrusion nozzles of a suitable configuration or by means of the provision of sliders within the mold halves 11. The production of multi-chamber hollow bodies by extrusion blow molding in that way is basically known and therefore does not need to be described in greater detail herein.

In the illustrated embodiment of the energy-absorbent component or bumper 1, particle foam is supplied to the blow molding while still in the closed mold, from supply containers 15, more specifically by way of the feed lines 16 and injection needles (not shown).

After the component has been produced and filled with particle foam, the filling openings, if required, can also be welded shut.

To increase the strength of the filling it is possible for individual foam particles to be welded within the hollow body by means of hot vapor. As an alternative thereto it is also possible to apply the process described in DE 199 30 903, the content of which is hereby incorporated herein by virtue of reference thereto.

As will be seen from the foregoing description the component in accordance with the invention is in the form of an integral component which can be easily produced in a complex operating procedure. The fact that the respective chambers of the component are each of a closed configuration and completely filled with foam affords a stable and load-bearing structure which satisfies both the demand for a high level of strength in respect of shape and also the demand for an in part low level of energy absorption with a long deformation travel. Cracking within the foam composite arrangement is generally not detrimental in terms of the stability of the component while there is no possibility of the foam crumbling and escaping, as in the case of open structures, because of the configuration of the hollow body with the respectively closed chambers accommodating foam fillings of differing energy absorption capability.

It will be appreciated that the above-described embodiment of the invention has been set forth solely by way of example and illustration of the principles thereof and that various modifications and alterations may be made therein without thereby departing from the spirit and scope of the invention.

What is claimed is:

1. An energy-absorbent component for a motor vehicle, comprising a blow-molded hollow body of thermoplastic material and defining a plurality of respectively closed chambers, a foam filling enclosed in each of said chambers, the foam fillings of the respective chambers being of differing energy absorption capability, wherein the component is of an elongate configuration, and wherein at least one said chamber forms a bearer which is stiff in respect of shape and extends over the entire length of the component, and a plurality of further chambers extending in the longitudinal direction of the component and disposed in front of said chamber forming said bearer, said further chambers forming various impact zones each of a differing energy absorption capability, wherein said further chambers disposed in front of said bearer are of increasing strength in a downward direction in the position of installation of the component.

2. A component as set forth in claim 1 wherein at least some of said chambers are respectively filled with foam of differing density.

3. A component as set forth in claim 1 wherein the foams are particle foams.

4. A component as set forth in claim 3 wherein said foams are in the form of minibeads.

5. A component as set forth in claim 1 wherein the hollow body comprises a plurality of different regions of differing wall thicknesses.

6. A component as set forth in claim 1 wherein said further chambers are of a smaller wall thickness than the chamber forming said bearer.

7. A component as set forth in claim 1 wherein particle foams of a density between 30 and 200 kg/m$^3$ are provided as the foams.

8. A component as set forth in claim 1 wherein the foam is a polypropylene particle foam (EPP).

* * * * *